L. O. BROWN & L. BAUROTH.
BARREL MAKING MACHINE.
APPLICATION FILED NOV. 5, 1908.

1,003,427.

Patented Sept. 19, 1911.
5 SHEETS—SHEET 2.

Witnesses
Eugene Schreiber
Hazel B. Hutt

Inventors:
Lewis O. Brown and
Leonhard Bauroth,
By Owen & Owen
Their attys.

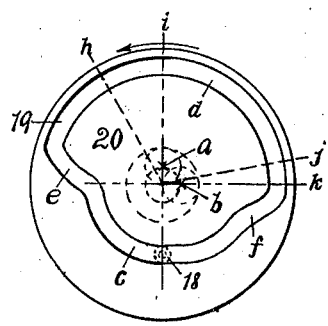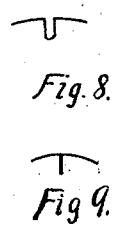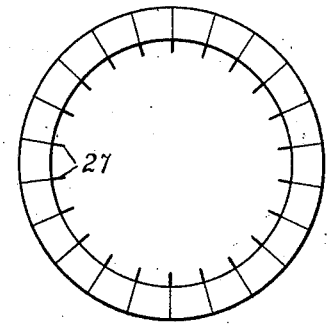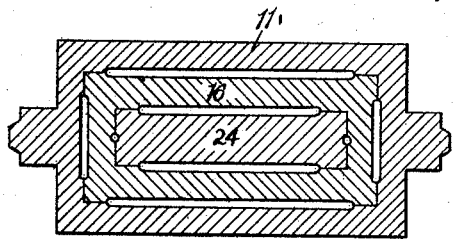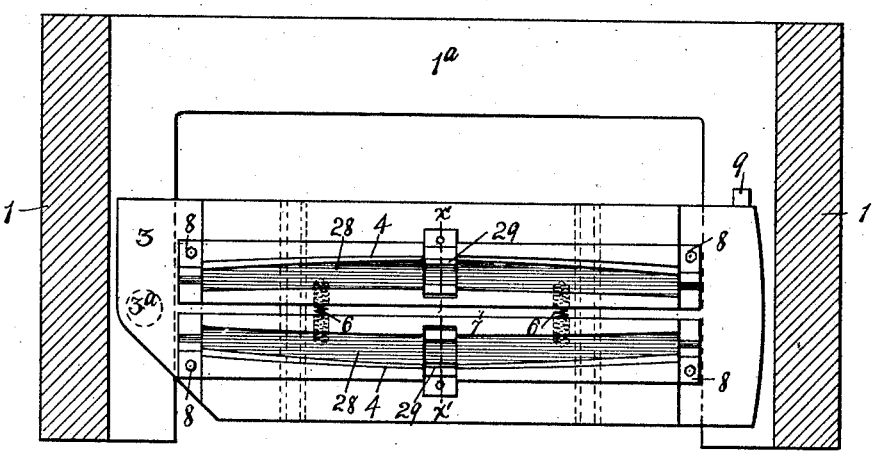

L. O. BROWN & L. BAUROTH.
BARREL MAKING MACHINE.
APPLICATION FILED NOV. 5, 1908.

1,003,427.

Patented Sept. 19, 1911.
5 SHEETS—SHEET 5.

Witnesses.

Inventors:

UNITED STATES PATENT OFFICE.

LEWIS O. BROWN AND LEONHARD BAUROTH, OF TOLEDO, OHIO, ASSIGNORS TO THE METALLIC BARREL COMPANY, OF CHICAGO, ILLINOIS, A CORPORATION OF MAINE.

BARREL-MAKING MACHINE.

1,003,427. Specification of Letters Patent. Patented Sept. 19, 1911.

Application filed November 5, 1908. Serial No. 461,138.

*To all whom it may concern:*

Be it known that we, LEWIS O. BROWN and LEONHARD BAUROTH, citizens of the United States, and residents of Toledo, in the county of Lucas and State of Ohio, have invented a certain new and useful Barrel-Making Machine; and we do hereby declare the following to be a full, clear, and exact description of the invention, such as will enable others skilled in the art to which it appertains to make and use the same, reference being had to the accompanying drawings, and to the figures and letters of reference marked thereon, which form a part of this specification.

Our invention relates to the manufacture of sheet-metal barrels of the class having spaced crimps or ribs formed longitudinally thereof to strengthen them against compression and to represent external stave formation.

The object of our invention is the provision of a simple and highly efficient machine of the draw or punch press variety for the manufacture of barrels of this type, which, in a single operation is adapted to operate on a portion of a sheet-metal blank or cylinder to form the requisite bilge therein and at the same time to form a longitudinal strengthening crimp or fold in such portion and tightly compress or close the same to give the barrel, when completed by a succession of such operations, a smooth external appearance, thus simplifying the manufacture and reducing the cost of production of barrels of this class to a minimum.

The operation, construction and arrangement of the parts of our invention are fully described in the following specification and two forms thereof illustrated in the accompanying drawings, in which,—

Figure 1:
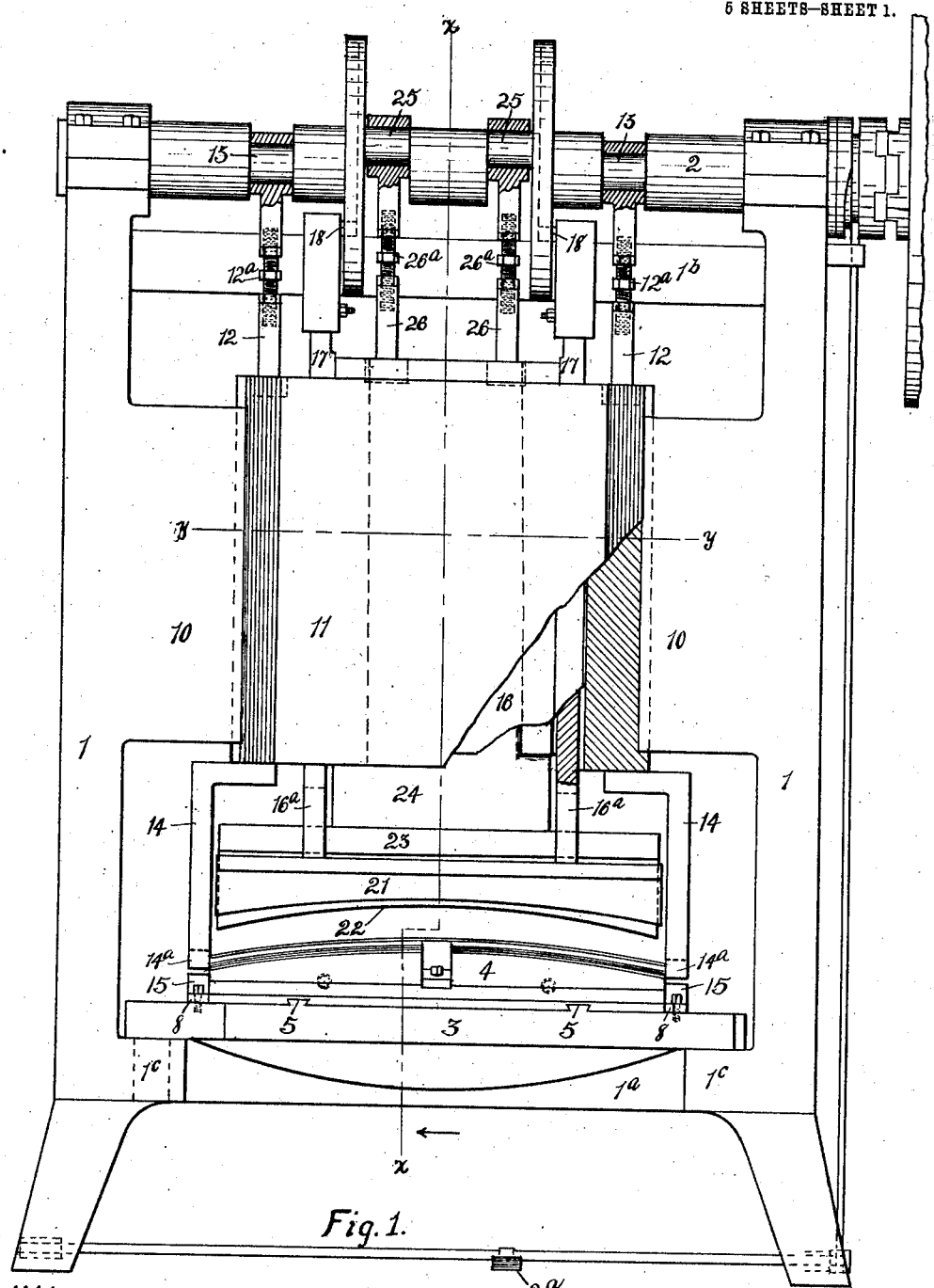
Figures 2, 3, 4:
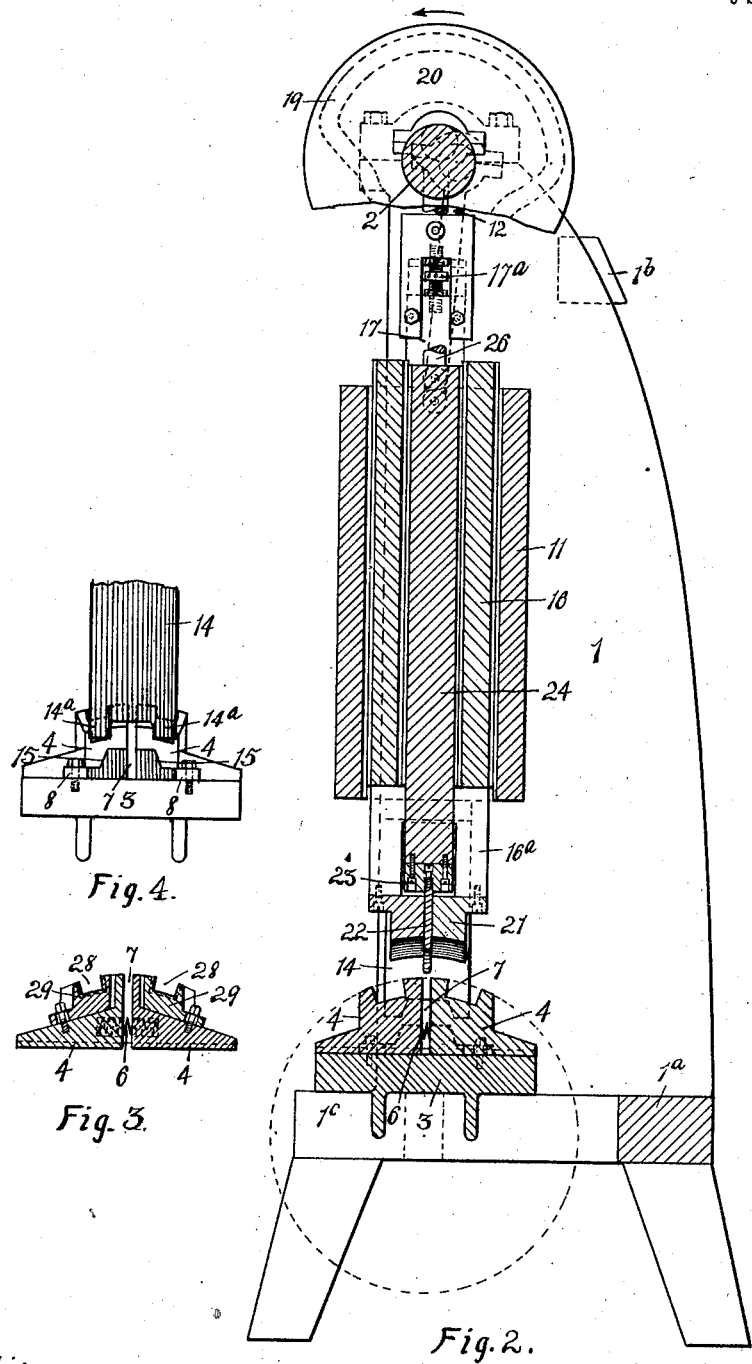
Figure 11:
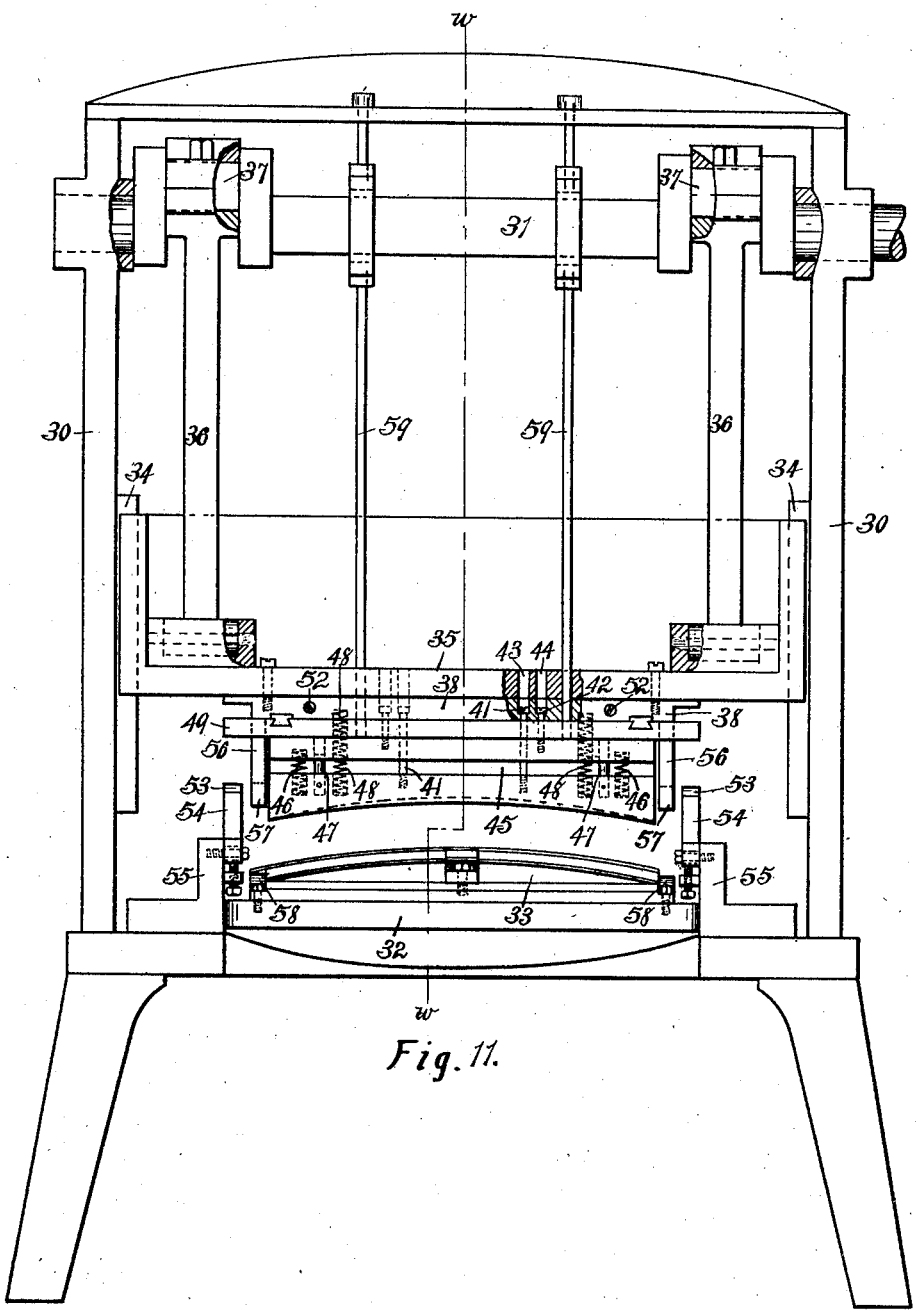
Figures 12, 13:
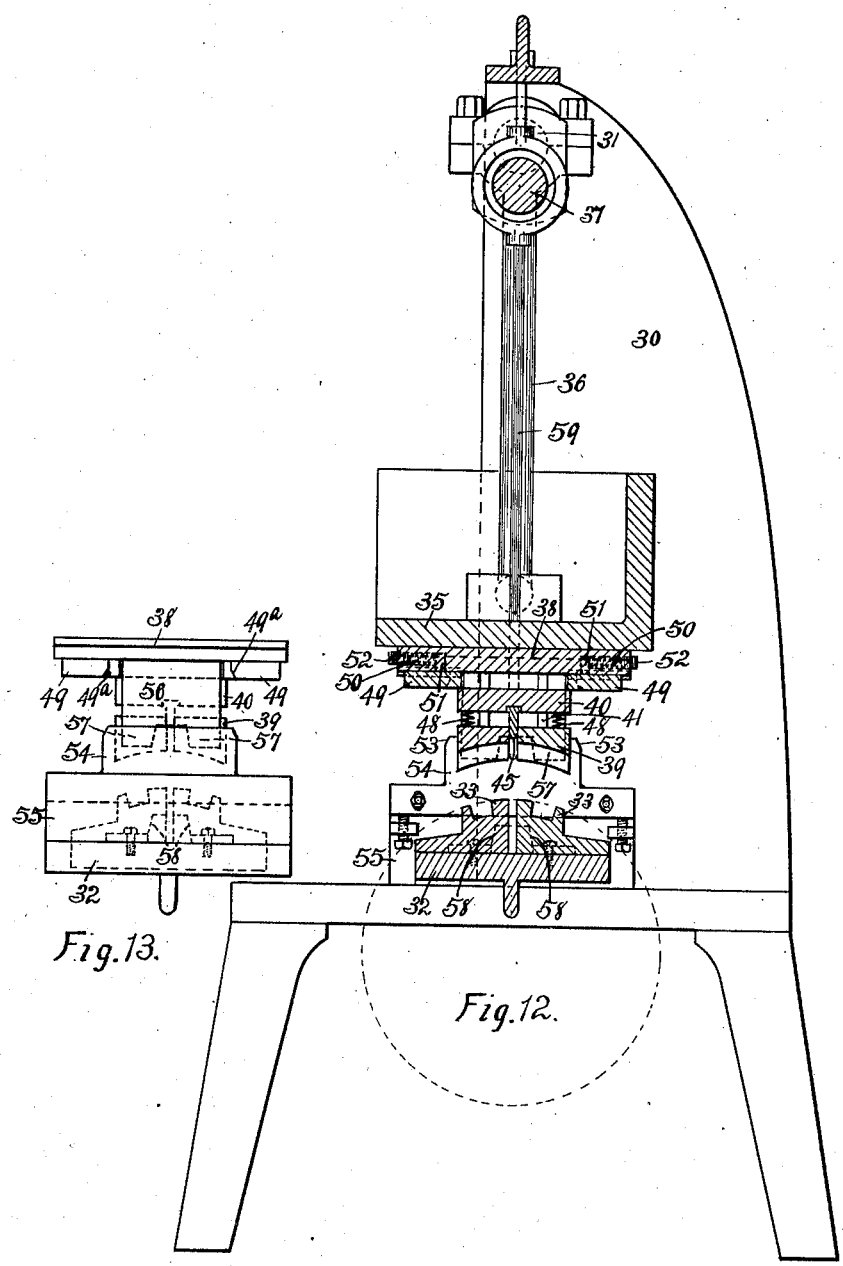

Figure 1 is a front elevation of a preferred form of machine embodying our invention, with portions thereof in partial section. Fig. 2 is a vertical section of the machine on the line $x\,x$ in Fig. 1. Fig. 3 is a vertical transverse section of the base bilge-forming and crimp-squeezing dies and the adjustable work-gaging blocks carried thereby taken on the line $x'\,x'$ in Fig. 5. Fig. 4 is an end view of the cams at the ends of the base-dies and a portion of the associated squeezing cam. Fig. 5 is a horizontal transverse section of the press frame with the parts above the base dies removed. Fig. 6 is a face view of the cam-disk on the crank-shaft with the relative positions of the shaft and different plunger-operating eccentrics shown in dotted lines. Fig. 7 is a cross-section on the line $y\,y$ in Fig. 1. Figs. 8 and 9 illustrate the two stages in the crimp forming operation, the former showing the crimp formed but not compressed, and the latter showing it squeezed or compressed together, as in the completed state. Fig. 10 is an end view of a completed barrel. Fig. 11 is a front elevation of a modified form of the machine embodying our invention. Fig. 12 is a transverse vertical section thereof taken on the line $w\,w$ in Fig. 11, and Fig. 13 is an end view of the bed-plate and parts disposed between it and the plunger.

Our invention in its broader aspect may be embodied in different forms of machines and in the present instance we have shown and described two forms, a preferred form, which is illustrated in Figs. 1 to 7 of the drawings, and a modified form, which is illustrated in Figs. 11 to 13.

Referring to the preferred form of machine, 1, 1 designate the sides or uprights of the press frame, which are connected at their lower portions by the part 1ª and at their upper portions by the part or yoke 1ᵇ, and have their upper ends provided with suitable bearings in which the ends of the crank or plunger-operating shaft 2 are mounted. This shaft has the usual belt-pulley and coacting clutch mounted on one end thereof, the clutch preferably being of the single revolution type and controlled by a treadle 2ª. The uprights 1, 1 are formed near their lower ends with inwardly projecting ledges 1ᶜ, which form supports for the ends of a bed-plate or block 3 on which the lower forming dies 4, 4 of the press are mounted. These dies are exact duplicates and are fashioned to coöperate with a pressure-pad hereinafter described to give the work the requisite bilge, and are mounted on the bed-plate 3 for relative transverse movements, being guided in such movements by dove-tailed rib and groove connection with the bed-plate, as shown at 5 in Fig. 1. Compression-springs 6 are interposed between the dies 4, 4 to yieldingly separate them to provide the longitudinal space 7 therebetween, see Figs. 2 and 3. The outward or retracting movements of the dies is limited by stop-blocks 8 which are secured to the bed-plate at the outer corners of the dies. The bed-plate 3 has one end pivoted to one supporting-ledge, as at 3ª, (Fig. 5), to adapt its other end to be swung forwardly free from the press-frame to enable a cylindrical blank to be placed over it and the dies 4, 4 or a completed barrel body to be removed therefrom. A stop 9 on the ledge supporting the free end of the bed-plates coacts therewith to limit its inward movement, see Fig. 5.

Guided for vertical reciprocatory movements in ways 10, 10 of the press-frame is a plunger 11, which has its upper end connected by pitmen 12, 12 to eccentrics 13, 13 on the shaft 2 and has its lower end provided at its sides with downwardly projecting-arms 14, 14 each of which has its lower end formed with pendent cam-lugs 14ª, 14ª which have their inner faces oppositely beveled to adapt them to coact with subjacent cam or correspondingly beveled surfaces 15, 15 on the respective ends of the base-dies 4, 4 to effect a contracting movement of such dies against the tension of the springs 6 when the plunger 11 is lowered.

16 designates a second plunger, which is mounted within an opening provided vertically through the plunger 11, as shown in Figs. 2 and 7, and is guided thereby for vertical reciprocatory movements. The plunger 16 has arms 17, 17 projecting rigidly from its upper end at the sides thereof and carrying laterally projecting rollers 18 for working in cam-grooves 19 provided in one face of the disks 20, which are carried by the shaft 2. The plunger 16 is provided at its lower side edges with legs or downwardly projecting extensions 16ª 16ª, to the lower ends of which the pressure-pad or upper die 21 is secured by screws or in any other suitable manner. This pad has its work engaging surface both transversely and longitudinally concaved to conform to the base-dies 4, 4 and to adapt it to coöperate therewith to form the desired bilge in the work, and is provided throughout its length with an opening in vertical register with the space 7 between the base-dies 4, 4 through which a crimp-forming punch 22 works.

The punch 22 is carried at the under side of a punch-block 23, which is disposed above the pressure-pad 21 and carried by a plunger 24. This plunger works through a vertical opening in the plunger 16, by which it is guided in its reciprocatory movements, and connects at its upper end with the like eccentrics 25, 25 on the shaft 2 through the medium of the pitmen 26, 26. In order to effect a uniformly increasing contraction of the diameter of the blank from the center to the ends thereof to impart the bilge formation thereto, the radius by which the nose of the punch 22 is struck is shorter than the radius of the base arc of the pressure-pad, thus causing the depth of a crimp to gradually increase from its center outwardly.

The pitmen 12, 17 and 26 are respectively provided with adjusting-screws 12ª, 17ª and 26ª, to permit a regulation of their lengths as the gage of metal operated on or the desired depth of the crimps may require.

The relative arrangement of the shaft eccentrics 13 and 25 to which the plungers 11 and 24 are respectively attached and the formation of the cam-grooves 19 in the disks 20, which operates the plunger 16, is such that on a revolution of the shaft 2 the plunger 16 carrying the pressure-pad 21 first lowers to coöperate with the dies 4, 4 to form the bilge in the portion of the work blank operated on; the punch 22 then descends and operates on the work to draw a portion thereof within the space 7 between the dies 4, 4 to form a crimp longitudinally therein throughout its length, after which it recedes from the work to permit a converging movement of the dies 4, 4 to closely compress the crimp thus formed due to the coacting of the cam-lugs 14ª, 14ª with the cams 15, 15 on the ends of the dies 4, 4, which is then effected by a lowering of the plunger 11. To accomplish this properly timed action of the several plungers the centers of the sets of eccentrics 13 and 25 are disposed at right angles to each other in the arc of a circle struck from the center of the shaft, with the centers of the eccentrics 25 standing at a point $a$ and the centers of the eccentrics 13 standing at a point $b$ when the shaft is in its normal or at-rest position, as shown in Fig. 6. The cam-grooves 19 of the disks 20 are composed of the two neutral zones or portions $c$ and $d$, in which the rollers 18 work when the pressure-pad 21 is in elevated or lowered positions, respectively, and the cam-zones or portions $e$ and $f$, which connect the ends of the neutral portions as shown. The zone $c$ is disposed on the opposite side of the shaft to the point $a$, and on a turning of the disks to the left, as shown by the arrow, the rollers 18 travel therein for approximately a quarter of a turn, then pass through the abrupt outwardly-angled cam-portions $e$, which effect the downstroke of the pressure-pad 21, then enter and continue in the neutral zone $b$ for nearly half of a revolution, during which time the pressure-pad is maintained lowered, and finally pass through the cam zones $f$ to the starting point in the zone $c$, whereby to effect a rather abrupt ascent of the pressure-pad. In following out the cycle of operations of the several operative parts, it will be apparent by reference to the diagram in Fig. 6, that the punch 22, whose eccentric center is $a$, begins its downstroke at the beginning of a revolution of the shaft, but is not lowered sufficiently to have contact with the work until the rollers 18 are approximately at a point in their respective grooves indicated by the dotted line $h$, which is after the pressure-pad has operated on the work. The crimp is formed during the period of travel of the rollers between the lines $h$—$i$ of the disks and the punch then ascends during the remaining half of the revolution. It will also be apparent that the die-squeezing cams $14^a$, whose eccentric center is $b$, will ascend during the first quarter of a revolution of the shaft, then descend during the second and third quarters of the revolution, acting on the cams 15 of the dies during approximately the portion of a revolution $j$—$k$, and ascending to the starting point during the remainder of the revolution.

As it is usually desired to make the spaces between the strengthening crimps or ribs 27 of a barrel (Fig. 10) of less distance than the working faces of the dies 4, the dies are each provided in such face with a longitudinally-extending groove 28 in which a completed crimp may be placed when the work is shifted preparatory to the next bilge and crimp forming operation, as otherwise a rib or crimp would be flattened between the pressure-pad and dies by the operation succeeding that which formed it. When the blank is shifted for the last operation the rib or crimp first formed is placed in the groove 28 of the front die. The width of the groove 28 is substantially equal to the depth of the crimps to permit the lateral movement of a crimp therein to allow for a contraction of the blank as each crimp is formed and compressed. In order to provide an adjustable stop for gaging the width of the spaces between the crimps, gage-blocks 29 are mounted in grooves provided transversely in the die faces and adapted for longitudinal adjustment therein. These blocks are provided in their top surfaces with grooves which register with but are preferably narrower than the die grooves 28. Either or both dies may be provided with a gage-block as desired.

The operation of this form of our invention is as follows: The work blank, which preferably comprises a strip of sheet-metal of the desired length and width bent into the form of a cylinder with its meeting edges locked together in a suitable manner, is placed over the base dies 4, 4, the bed-plate 3 and dies being swung outwardly for such purpose and then returned to operative position. The blank now being in readiness to be operated on, the treadle is depressed to permit an engagement of the clutch and drive pulley to effect a single revolution of the shaft 2. As the shaft revolves, the pressure-pad 21 first descends to coöperate with the dies 4, 4 to operate on the work to give it the desired bilge formation after which the punch 22 descends to press a registering portion of the blank within the space 7 between the dies to form a crimp therein. The punch 22 then ascends and the squeezing cam-lugs $14^a$, carried by the plunger 11, lower into contact with the registering cams 15 on the die ends, thus effecting converging movements of the two dies to closely compress the crimp just formed and completing the cycle of operations excepting for the return of the pressure-pad 21 and cam-lugs $14^a$ to their normal at-rest positions, which return now takes place. After the work blank has been shifted to place the crimp just formed in the groove 28 of the die 4 disposed in the direction in which the blank is moved and in abutment with the gage-block 29, the operation above described is repeated to form another crimp or rib 27 and to broaden the bilged portion, which operations are repeated until the entire circumference of the blank has been acted on.

In the modified form of our invention which is illustrated in Figs. 11, 12 and 13, 30 designates the press frame; 31 the crank or eccentric shaft, which is journaled in the upper ends of the frame sides or uprights, 32 the bed-plate which is swingingly supported by the frame, and 33, 33 the companion base-dies, which are similar in construction and operation to the base-dies 4, 4. Vertically movable between guides 34 of the frame sides is a plunger 35, which is connected by pitmen 36 to cranks 37, 37 of the shaft 31 by means of which the requisite reciprocation is imparted to the plunger. Secured to the underside of the plunger 35 is a plate 38 from which the pressure-pad 39 and punch-block 40 are suspended in normally spaced superimposed relation and for limited vertical movements relative to said plate by the sets of screws 41 and 42, the heads of which work in holes or bores 43, and 44, respectively, provided through the plunger 35 and partially through the plate 38, as shown in Fig. 11. The punch-block 40 has its punch 45 working through a longitudinal opening in the pressure-pad, and is yieldingly spaced from the pressure-pad by expansion-springs 46 (Fig. 11) to normally maintain the punch 45 drawn upwardly within the pressure-pad. Pins 47 project upwardly from the pressure-pad and work in registering mortises in the punch-block to guide their relative movements. A set of compression-springs 48 work through openings in the punch-block 40 and have their opposite ends thrust against the plate 38 and pressure-pad 39 to normally maintain them yieldingly spaced apart to their full limit of relative outward movements. When the plunger 35 is in full elevated position and during the initial portion of its down-stroke the punch-block 40 is held rigidly spaced from the plate 38 by lock-blocks 49, 49, one of which is carried by the plate 38 at each side of the punch-block. These lock-blocks are mounted for transverse sliding movements relative to said plate and punch-block to permit their withdrawal from between said parts to enable the punch-block to move upwardly into contact with the plate 38 under the influence of the springs 46. The lock-blocks 49 have their inward movements influenced by coiled compression-springs 50, which are mounted in sockets provided in the sides of the plate 38 and have their inward ends thrust against lugs 51 projecting upwardly into said sockets from the blocks 49 and their outward ends thrust against screw-plugs 52 inserted in the outer ends of the sockets. The lock-blocks 49 are provided at each end with cam surfaces 49$^a$ and have positive outward or punch-block releasing movements imparted thereto at a predetermined point in a descent of the plunger due to such surfaces coacting with the beveled upper corners 53 of the release-blocks 54, which blocks 54 are adjustably supported by top-bosses 55 of the bed-plate 32, as shown, thus adapting the tripping point of the lock-blocks to be adjusted as desired. 56, 56 designate arms which project downwardly from the plate 38 at the ends of the pressure-pad 39 and punch-block 40 and terminate in spaced lugs 57, the inner faces of which are beveled to form squeezing-cams for coacting with the registering cam-surfaces 58 on the respective ends of the dies 33, 33 at a predetermined point in a descent of the plunger to effect a relative contraction of the dies 33, 33 to compress a formed crimp. 59, 59 designate rods which have their upper ends fixed to the frame top and their lower ends projecting loosely through the plunger 35 and bottom-plate 38 in position to abut against and form stops for limiting the upward movement of the punch-block 40 on an upstroke of the plunger, whereby the plunger 35, plate 38 and lock-blocks 49 complete the last portion of the upstroke independent of the punch-block and pressure-pad to permit the lock-blocks 49 to automatically move into locking engagement with the punch-block. The operation of this form of our invention is as follows: A work blank having been placed over the bed-plate 32 and base-dies 33, the customary treadle (not shown) is depressed to cause a single revolution of the shaft 31. On a downstroke of the plunger the pressure-pad 39 first acts on the blank in conjunction with the base-dies 33 to shape the same in conformity to the dies, and on the continued downward movement of the plunger it yields relative to the plunger and the punch-block 40 to permit the punch 45 to work through the pressure-pad and into the space between the dies to form a crimp longitudinally in the blank. By the time the formation of the crimp is completed the cam-surfaces 49$^a$ of the lock-blocks 49 have lowered into contact with the release-blocks 54, thus effecting a release of said lock-blocks from engagement with the punch-block to permit it to move upwardly, under the influence of the springs 46, and withdraw the punch 45 from between the dies. The squeezing-cams 57 have now lowered sufficiently to coact with the cam-surfaces 58 on the die ends to effect a relative contraction of the dies to compress the formed crimp, which operation completes the downstroke of the plunger. When the plunger on its upstroke nears the completion of its movement the ascent of the punch-block 40 is stopped by contact with the stop-rods 59, thus permitting a sufficient independent movement of the plunger 35, bottom-plate 38 and lock-blocks 49 to enable said blocks to move into locking engagement with the punch-block.

We desire it to be understood that our invention is not limited to any specific form or arrangement of parts except in so far as such limitations are specified in the claims.

Having thus described our invention, what we claim as new and desire to secure by Letters Patent, is,—

1. In a machine of the class described, the combination of a die of a shape to impart a bilge to a blank, mechanism for pressing the blank upon the die in the bilge forming operation, means coöperating with such die to form a crimp in the blank, said mechanism being arranged to hold the blank upon the die during the crimping operation.

2. In a machine of the class described, the combination of a die of bilge shape and having parts movable toward and away from each other, means for pressing the blank upon the die to impart bilge form thereto and for depressing the blank between said die parts to partially form a crimp, and means for forcing said die parts together to complete the crimp.

3. In a machine of the class described, the combination of a die of a shape to impart a bilge to a blank, and mechanism coöperating with said die to bilge a blank, form a crimp therein and press the walls of the crimp together.

4. In a machine of the class described, the combination of a die having relatively movable crimp forming and closing parts, mechanism for coöperating with said die to bilge a blank, crimp the same and relatively move said die parts to close the formed crimp, and revoluble means adapted at a single continuous revolution to move said mechanism to perform said functions and to return it to starting position.

5. In a machine of the class described, a combined bilge and crimp forming die having parts relatively movable to compress a formed crimp, and mechanism having differentially movable parts capable of automatically acting in sequential order to bilge and inwardly crimp the work and force the die parts together to compress a crimp.

6. In a barrel making machine, a set of dies capable of relative transverse movements and normally retracted to provide an intervening space, a pressure-pad for coöperating with said dies to shape the blank, a punch movable to force a portion of the blank within said space to form a crimp therein, means movable to effect a relative contraction of the dies to compress a crimp when formed, and mechanism operative to move the pressure-pad, punch and said means to successively act to perform their respective functions.

7. In a barrel making machine, a set of dies capable of relative transverse movements and normally spaced apart, a part for coöperating with said dies to shape and hold the blank, a punch capable of movements relative to said parts and adapted to force a portion of the blank within the space between said dies to form a crimp therein, cam means movable to coact with the dies to effect a relative contraction thereof to compress the formed crimp, and rotary means having connection with and movable to cause said part, punch and cam means to successively perform their respective functions.

8. In a machine of the class described, a combined bilging and crimp forming die having parts relatively movable to compress a formed crimp, a plurality of relatively movable work co-acting members adapted to sequentially act to shape a blank over the die, form a crimp therein, and move the relatively movable die parts to compress a formed crimp, yielding means for retracting said die parts after compressing a crimp, and mechanism operative to move and to automatically control the movements of said members to cause them to act in such order.

9. In a machine of the class described, a revoluble element, a lower die, an upper die for coöperating with the lower die to form a bilge in the work, a punch adapted to coöperate with the lower die to form a crimp in the work, and means coöperating with the crimp forming portions of the lower die to relatively move such portions to close a formed crimp, said upper die, punch and means being movable by said revoluble element to successively operate on the work at predetermined points in a single revolution thereof.

10. In a machine of the class described, a set of dies capable of relative transverse movements and yieldingly spaced apart, said dies having their ends provided with cam surfaces, a pressure-pad movable to coöperate with said dies to shape and hold the work, a punch movable to coöperate with said dies to form a crimp in the work, squeezing-cams movable to coact with the cam surfaces on the dies to force them together to compress the crimped portion of the work, and a revoluble element having connection with the pressure-pad, the punch and the squeezing-cams to move them to successively act on the work during a single revolution of the element.

11. In a machine of the class described, a set of dies capable of relative transverse movements and yieldingly spaced apart, a pressure-pad, a punch, and squeezing-cams, all capable of relative movements and adapted to respectively act to shape and crimp the blank and to cause a contracting movement of the dies, and mechanism for moving said pressure-pad, punch and cams to cause them to perform their respective functions in sequence.

12. In a machine of the class described, a pair of base-dies capable of relative transverse movements and yieldingly spaced apart, a reciprocatory pressure-pad for coöperating with the dies to shape and hold the work, a reciprocatory punch working through the pressure-pad and adapted to act on the work to crimp it in the space between the dies, reciprocatory cam members adapted to act on portions of the dies to impart squeezing movements thereto, and mechanism controlling the movements of said pressure-pad, punch and cam members to cause them to act in sequence.

13. In a machine of the class described, the combination of a base-die having a longitudinal crimp-forming recess and a groove substantially parallel with and of greater width than said recess, and adjustable gage means disposed within the groove to coöperate with a formed crimp to hold the work in position for a subsequent operation.

14. In a machine of the class described, a base-die, said die having a longitudinal crimp-forming recess and a groove parallel with and of greater width than said recess, and a gage-block associated with the groove and adjustable relative thereto to coöperate with a formed crimp to hold the work in position for a subsequent operation.

15. In a machine of the class described, the combination with the frame, of a die of a shape to impart a bilge to a blank, said die being capable of movement relative to the frame to permit a longitudinal removal of the work therefrom.

16. In a machine of the class described, the combination with the frame, of a bed-plate supported thereby, and a die carried by the bed-plate, said bed-plate being capable of swinging relative to the frame to permit cylindrical work to be longitudinally removed from around said plate and die or placed thereon.

17. In combination, a frame, a bed-plate supported at its ends by the frame, a base-die carried by the bed-plate, a pressure-pad for coöperating with the die to bilge a cylindrical blank, and means for operating the pressure-pad, said bed-plate being capable of swinging relative to the frame to permit work to be placed over the dies or removed therefrom.

18. In a machine of the class described, a set of dies capable of relative transverse movements and being yieldingly spaced apart, three relatively movable plungers, a pressure-pad carried by one plunger and movable therewith to coöperate with the dies to shape the work, a punch carried by another of said plungers and movable therewith to crimp the work in the space between the dies, cam members carried by the third plunger and movable therewith to coact with portions of the dies to impart crimp squeezing movements thereto, and mechanism operative to impart differential movements to the several plungers to cause the parts carried thereby to sequentially perform their several functions.

19. In a machine of the class described, a combined bilge and crimp-forming die having reciprocatory parts adapted during a single operation to act to bilge and crimp the blank and move the die parts to compress a formed crimp, and mechanism for moving and controlling the relative movements of said parts.

20. In a crimping machine, a pair of die members each movable toward and from the other, means for causing them simultaneously to approach each other, means for causing them to recede from each other, a punch mounted to reciprocate into and out of the opening between the members when in their more remote position, and a presser member adapted to hold a sheet of material on the die members during the operation of the punch.

21. In a crimping machine, a pair of die members each movable toward and from the other in a horizontal plane, means for causing them simultaneously to approach each other, means for causing them to recede from each other, a punch mounted to reciprocate vertically into and out of the opening between the members when in their more remote position, and a vertically reciprocating presser member adapted to hold a sheet of material on the die members during the operation of the punch.

In testimony whereof we have hereunto signed our names to this specification in the presence of two subscribing witnesses.

LEWIS O. BROWN.
LEONHARD BAUROTH.

Witnesses:
C. W. OWEN,
HAZEL B. HIETT.

---

Copies of this patent may be obtained for five cents each, by addressing the "Commissioner of Patents, Washington, D. C."